United States Patent
Miura et al.

(10) Patent No.: US 7,188,613 B2
(45) Date of Patent: Mar. 13, 2007

(54) FUEL CUT OFF VALVE

(75) Inventors: Natsushi Miura, Aichi-ken (JP); Tomohide Aoki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/374,381

(22) Filed: Mar. 14, 2006

(65) Prior Publication Data
US 2006/0213555 A1 Sep. 28, 2006

(30) Foreign Application Priority Data
Mar. 22, 2005 (JP) .............................. 2005-081476

(51) Int. Cl.
F02M 37/20 (2006.01)
(52) U.S. Cl. .................. 123/516; 123/198 D; 137/202
(58) Field of Classification Search ................ 123/516, 123/198 D, 518, 519, 520; 137/202, 43, 137/587, 493
See application file for complete search history.

(56) References Cited

U.S. PATENT DOCUMENTS

| | | | | |
|---|---|---|---|---|
| 5,172,714 A | * | 12/1992 | Kobayashi et al. ........... 137/39 |
| 5,392,804 A | * | 2/1995 | Kondo et al. ................ 137/202 |
| 5,529,086 A | * | 6/1996 | Kasugai et al. ............. 137/202 |
| 5,535,772 A | | 7/1996 | Roetker et al. |
| 5,577,526 A | | 11/1996 | Kasugai et al. |
| 6,145,523 A | * | 11/2000 | Lo ............................. 135/28 |
| 6,557,578 B2 | * | 5/2003 | Shimamura et al. ........ 137/202 |
| 7,114,513 B2 | * | 10/2006 | Kurihara et al. ............ 137/202 |
| 2003/0230288 A1 | * | 12/2003 | King et al. .................. 123/516 |

FOREIGN PATENT DOCUMENTS

JP  A-H07-293384  11/1995
JP  A-2002-285929  10/2002

* cited by examiner

*Primary Examiner*—Carl S. Miller
(74) *Attorney, Agent, or Firm*—Posz Law Group, PLC

(57) ABSTRACT

A fuel valve comprises a first valve chamber and a second valve chamber within a casing, where a first valve mechanism and a second valve mechanism are housed in the respective valve chambers. A first float of the first valve mechanism rises when the fuel level reaches a first liquid level, to close a first connection conduit. The second valve mechanism rises to close a second connection conduit when a second liquid level, which is higher than the first liquid level is reached. A valve conduit, which acts as a restriction path, is provided between the first valve chamber and the second valve chamber. The valve conduit is formed with a conduit area that is less than that of the first connection conduit, so as to increase the pressure within the fuel tank when the first connection conduit is closed.

20 Claims, 12 Drawing Sheets

FUEL CUT OFF VALVE

This application claims the benefit of and priority from Japanese Application No. 2005-81476 filed Mar. 22, 2005, the content of which is incorporated herein by reference.

BACKGROUND OF THE INVENTION

1. Field of the Invention

The present invention relates to a fuel cut off valve mounted on an upper wall of a fuel tank to open and close a connection conduit, which connects the inside of the fuel tank with the outside.

2. Description of the Related Art

A well known fuel cut off valve is described in JP-A-7-293,384 and U.S. Pat. No. 5,535,772. The valve comprises two-stage tank fill control valve that has the function of preventing overfill and blowback from filling ports. The valve comprises a bottom valve chamber, a middle valve chamber, and an upper valve chamber, which are disposed from the bottom to the upper portion within a casing, a lower float that is housed within the bottom valve chamber and an upper float that is housed within the upper valve chamber. In structure of the fuel cut of valve, overfilling fuel and fuel blowback from the filling port are prevented through the lower float and the upper float rising and falling sequentially.

While in recent years there have been demands for flattening the fuel cut off valves, accompanying flattened fuel tanks, the conventional valve requires a middle chamber between the upper chamber and the bottom chamber and thus the shape of the fuel cut off valve is large in the vertical direction, making it incompatible with the demands for flattened fuel tanks.

Furthermore, another known conventional valve is described in JP-A-2002-285929. The valve comprises two lower chambers disposed in the horizontal direction, and upper chambers that are disposed continuous with each of the lower chambers above each of these lower chambers, a float housed in each of the lower chambers. The valve is structured to perform the actions described above through the rising and falling of each of the floats depending on the fuel level. However, even in this other conventional valve, the upper chamber is disposed above each of the lower chambers, and thus there is the same problem as the valve descried above.

SUMMARY

An advantage of some aspects of the invention is to provide a small fuel cut off valve that can contribute to the flattening of fuel tanks.

According to an aspect of the invention is provides with a cut off valve that is to be attached to an upper portion of a fuel tank and opens and closes a connection conduit for connecting an inside of the tank to outside of the tank according to a fuel level in the fuel tank. The cut off valve comprising a casing including (i) a first valve chamber that is connected to the inside of the fuel tank, (ii) a second valve chamber that is connected to the first valve chamber, (iii) a first connection conduit that connects the first valve chamber and the second valve chamber, and (iv) a second connection conduit that connects the second valve chamber to the outside. The fuel cut of valve further comprises a first valve mechanism, housed within the first valve chamber, that closes the first connection conduit when the fuel level rises to reach a first liquid level; a second valve mechanism, housed in the second valve chamber, that closes the second connection conduit when the fuel level reaches a second liquid level that is higher than the first liquid level; and a restriction path, disposed between the first valve chamber and the second valve chamber, that reduces the flow from the first valve chamber to the second valve chamber so as to increase the pressure within the fuel tank when the first valve mechanism closes the first connect conduit.

When the fuel cut off valve according to the present invention is used and fuel is supplied to the fuel tank and arrives at the first liquid level, the fuel flows into the first valve chamber and the first valve mechanism rises to close the first connection conduit. In this state, the effect of the restriction path reduces the flow from the first valve chamber to the second valve chamber, causing the pressure within the fuel tank to rise. This increase in the pressure within the fuel tank causes the fluid level in the inlet pipe to rise, triggering the auto-stop that stops the fueling from the fueling nozzle. In this way, the restriction path reduces the flow to the outside from the inside of the fuel tank, but because the ventilation itself is maintained, this can avoid a sudden increase in tank-internal pressure, enabling the prevention of fuel blowback. Moreover, when the fuel level reaches the second liquid level, the second valve mechanism rises to close the second connection conduit, at which time the fuel tank is sealed relative to the canister side, enabling the prevention of overfilling by the fuel gun.

In the fuel cut off valve, the fuel tank is connected to the outside through the first valve chamber, the first connection conduit, the restriction path, the second valve chamber, and the second connection conduit in series, enabling the middle chamber, such as described in the conventional technology, to be eliminated, enabling a reduction in size. Additionally, because fuel is not held in the vicinity of the top wall of the fuel tank, it is possible to reduce the so-called "dead space" within the fuel tank, not only enabling an increase in the effective capacity of the fuel tank, but also simplifying and increasing the reliability of the timing with which the second valve mechanism rises within the second valve chamber.

As a preferred form of the present invention, the casing may be provided with a first seal part at the opening peripheral part of the first connection conduit, where the restriction path can be structured so as to be formed between the first valve mechanism and the first seal part. The restriction path can be structured from a valve conduit wherein a portion of the first seal part is cut away, connecting to the first connection conduit, or can be structured from a valve conduit wherein a portion of the top surface of the first valve mechanism is cut away, etc. These structures can prevent the valve conduit from tightly sealing around the entire periphery of the first seal part to reduce the force of the sealing with the first seal part, to thereby prevent the first valve mechanism from sticking to a first seal part.

Furthermore, as a preferred form of the present invention, the casing may be provided with a side connection hole that is blocked by the fuel when the fuel level reaches the second liquid level, where the side connection hole can have a structure so that the pressure differential between the pressure within the fuel tank and the pressure in the second valve chamber causes the fuel to flow into the second valve chamber from the first valve chamber to cause the second valve mechanism to close the second connection conduit. This structure allows the first liquid level to be set using the rise position of the first valve mechanism independently of the second liquid level, which is set by the submersion of the side connection hole, and thus by setting the distance to be small, this can be applied to a case wherein one wishes to reduce the amount of additional fuel in a flat fuel tank configuration.

The first valve mechanism may be provided with a first float that rises due to the buoyant force that is generated by the fuel that flows into the first valve chamber when the fuel level reaches the first liquid level, and, at the top of the first float part, an inclined surface may be provided at the upper part of the first float so that not only will the flow of gas from the side connection hole be guided to the first connection conduit, but the flow of the gas will push the first float in the downward direction. This structure can eliminated the variability in the auto-stop fuel level without the first float being sucked upwards suddenly by the gas flow.

Furthermore, in the fuel cut off valve, the fuel tank is connected to the outside through only the second valve chamber, and the seal is only in a single location of the second connection conduit, and thus there is a superior effect in the prevention of leakage, with simplicity and improved seal performance.

Moreover, as another form, a guide protrusion is provided on the side wall of the first float, where a guide hole for guiding the guide protrusion is provided in the first casing part, so as to enable a structure where not only do the guide protrusion and the guide hole guide the first float in the vertical direction, but also prevent rotation. This structure enables the inclined surface to face the side connection hole, enabling the venting to be performed reliably.

Furthermore, as another form, the second valve mechanism may be provided with a second float that has a valve portion, a seat part, equipped on the upper part of the second float, for opening and closing the second connection conduit, and an upper valve mechanism that has a connection hole with a smaller conduit area than the second connection conduit, and connected to the second connection conduit, enabling a structure wherein the connection hole is opened and closed by the valve portion by the rising and falling of the second float. This structure can improve the reopening performance of the second valve mechanism.

Moreover, preferable the casing is structured with the provision of a means for draining the fuel from the second valve chamber when the fuel level drops when the second valve chamber is disposed in parallel with the first valve chamber, because the second valve chamber is at the same height as, and is in series with, the first valve chamber. As such means, a drain mechanism may be provided at the bottom of the casing so as to drain the fuel that has accumulated within the second valve mechanism when the fuel level has dropped beneath the bottom edge of the second valve chamber. The drain mechanism can prevent the second valve mechanism from becoming stuck in a closed state when the fuel level has dropped beneath the second liquid level.

In another embodiment according to the present invention, the casing can be provided with a partition wall that divides into the first chamber and the second chamber, where the restriction path can be structured as a valve conduit formed in the partition wall.

Moreover, another form of embodiment according to the present invention is provided with fuel cut off valve that is to be attached to an upper portion of a fuel tank and opens and closes a connection conduit for connecting an inside of the tank to outside of the tank according to a fuel level in the fuel tank, the cut off valve comprising a casing including (i) a first valve chamber that is connected to the inside of the fuel tank, (ii) a second valve chamber that is connected to the first valve chamber, (iii) a first connection conduit that connects the first valve chamber and the second valve chamber, (iv) a first seal part that is formed on an opening peripheral part of the first connection conduit, (v) a second connection conduit that connects the second valve chamber and the outside, and (vi) a second seal part that is formed on an opening peripheral part of the second connection conduit. The fuel cut off valve further comprises a first valve mechanism, housed in the first valve chamber, that seats on the first seal part to close the first connection conduit when the fuel level reaches a first liquid level; a second valve mechanism, housed within the second valve chamber and seats on the second seal part to close the second connection conduit when the fuel level reaches a second liquid level, the second liquid level being higher than the first liquid level; and a restriction path, formed between the first valve chamber and the second valve chamber, that forms a path area that is smaller than the conduit area of the first connection conduit, so as to cause the pressure within the fuel tank to rise when the first valve mechanism seats on the first seal part.

DESCRIPTION OF THE PREFERRED EMBODIMENTS

In order to more fully explain the structure and action of the present invention, described above, explanations will be given below regarding preferred embodiment according to the present invention.

A. First Embodiment (1) Schematic Structure of the Fuel Cut off Valve

Figure 1:
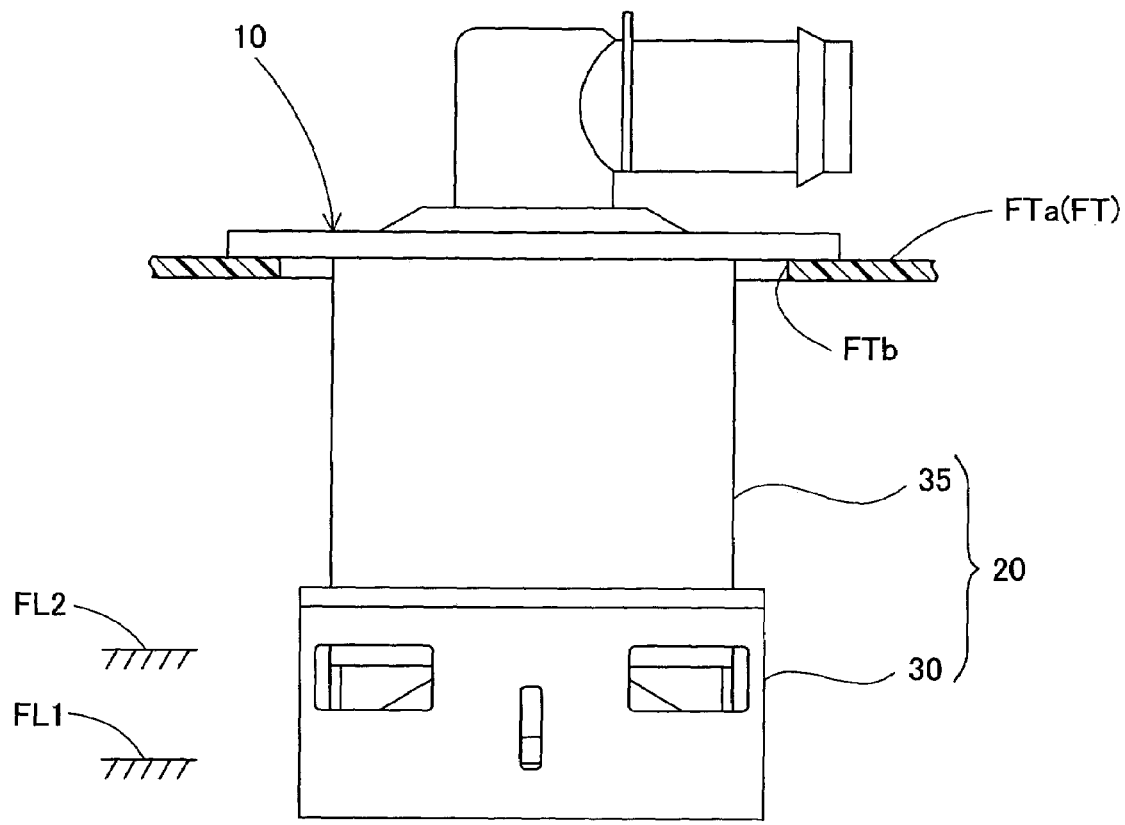
FIG. 1 is a side view illustrating a fuel cut off valve attached to the upper part of a fuel tank of a vehicle according to a first embodiment of the present invention.
Figure 2:
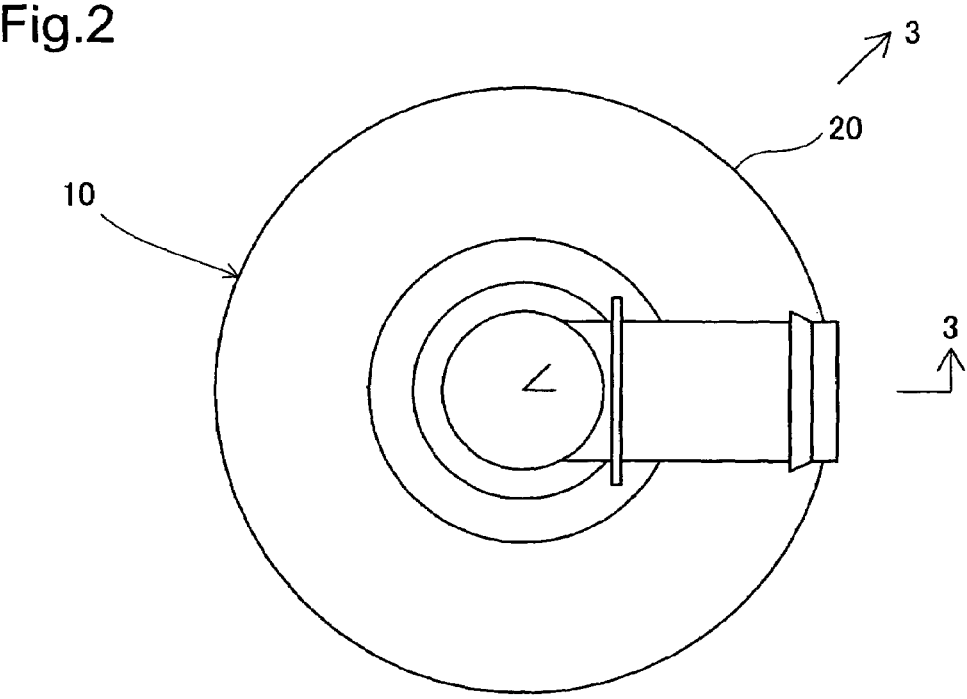
FIG. 2 is a plan view of a fuel cut off valve.
Figure 3:
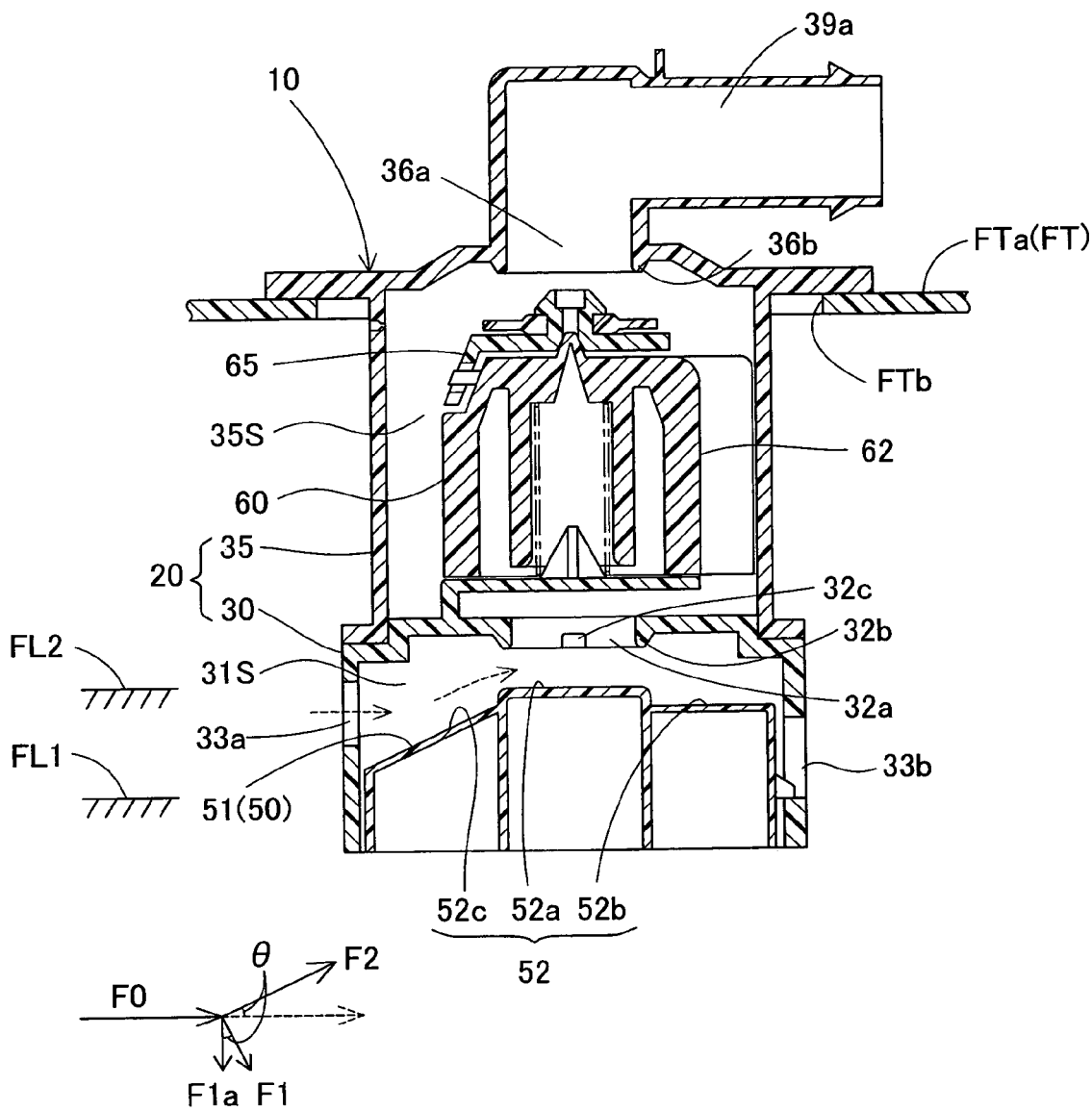
FIG. 3 is a cross-sectional view along 3—3 line of FIG. 2.

FIG. 1 is a side view showing a fuel cut off valve 10 attached to the upper wall of a fuel tank FT of a vehicle, according to a first embodiment of the present invention, FIG. 2 is a plan view of the fuel cut off valve 10, and FIG. 3 is a cross-sectional view along 3—3 line of FIG. 2. In FIG. 1, the fuel tank FT is fabricated from a compound resin material including polyethylene in the surface layer thereof, where at an attachment hole FTb are formed in a tank upper wall FTa. The fuel cut off valve 10 is attached on the tank upper wall FTa with the lower part thereof inserted into the attachment hole FTb. The fuel cut off valve 10 controls the flow of fuel within the fuel tank from flowing out to the canister when, during fueling, the fuel reaches a first liquid level FL1, and also triggers the auto-stop function, and prevents overfilling when the second liquid level FL2 is exceeded.

(2) Structure of Each Part of the Fuel Cut off Valve 10

In FIG. 3, the fuel cut off valve 10 comprises, as the primary structure thereof, a casing 20, a first valve mechanism 50, and a second valve mechanism 60. The casing 20 comprises a first casing part 30 and a second casing part 35, which is attached on top of the first casing part 30, where the first valve mechanism 50 is housed within a first valve chamber 31S of the first casing part 30, and the second valve mechanism 60 is housed within a second valve chamber 35S of the second casing part 35.

Figure 4:
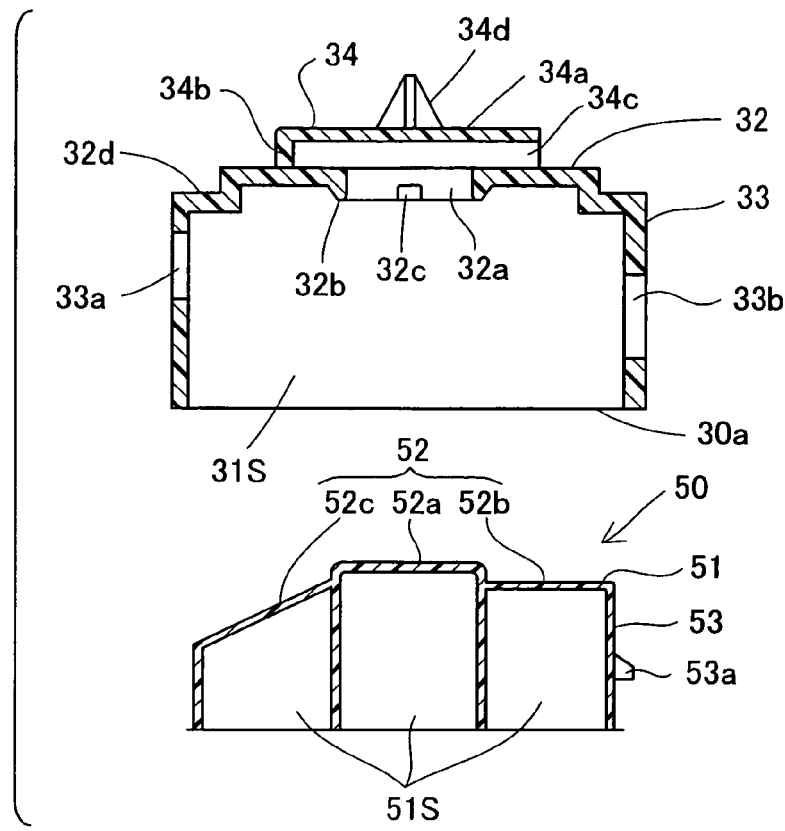
FIG. 4 is a cross-sectional view of the assembly of a first casing part and a first valve mechanism.
Figure 5:
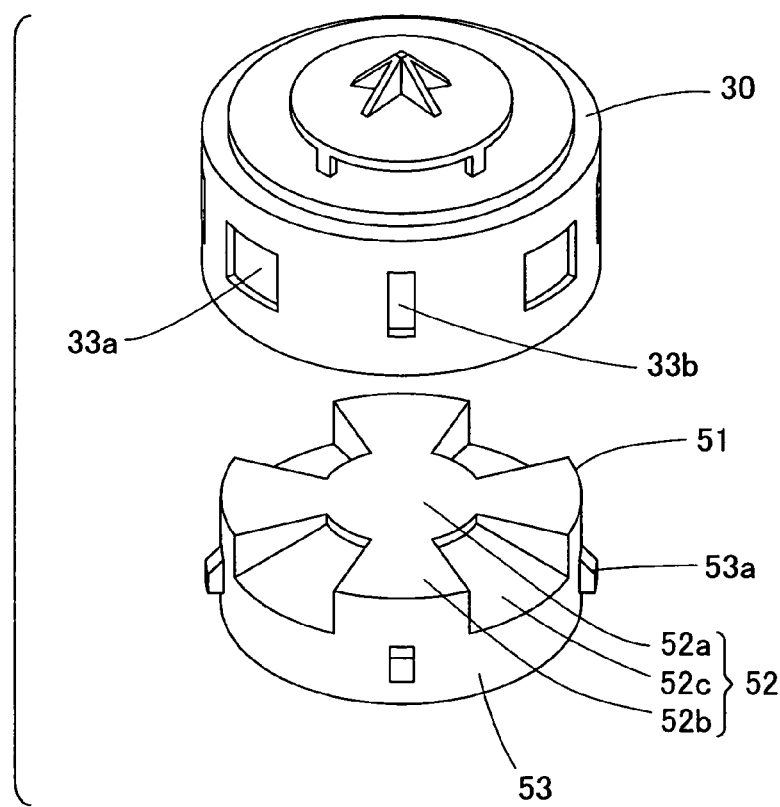
FIG. 5 is a perspective view of the assembly of the first casing part and the first valve mechanism.

FIG. 4 is a cross-sectional view of the assembly of the first casing part 30 and the first valve mechanism 50, and FIG. 5 is a perspective view of the assembly of the first casing part 30 and the first valve mechanism 50. The first casing part 30 is cup shaped, with a top wall 32, which forms a partition wall from the second casing part 35 (FIG. 3), and is surrounded by a side wall 33, which is formed in the shape of a downward-facing cylinder, from the peripheral part of the top wall 32, where the downwards direction is a lower opening 30a. A first connection conduit 32a, which is continuous with the first valve chamber 31S and second valve chamber 35S (FIG. 3) is formed in the center of the top wall 32. The opening peripheral part on the first valve chamber 31S side of the first connection conduit 32a forms a first seal part 32b. Note that the first seal part 32b has four valve conduits 32c, formed from the restriction path, wherein portions of the first seal part 32b are cut away, formed at an interval of 90 degrees around the periphery thereof. Four side connection holes 33a are formed at an interval of 90 degrees around the periphery of the side wall 33. The side connection holes 33a are continuous with the fuel tank FT and the first valve chamber 31S. A top plate 34a is supported by legs 34b on the top surface of the top wall 32, and a connecting path 34c, which connects to the first connection conduit 32a, is formed in the top wall 32. A spring support part is equipped protruding from the top surface of the center of the top plate 34a.

The first valve mechanism 50 is housed within the first valve chamber 31S, and comprises a first float 51. The first float 51 has a cup shape that has a buoyancy chamber 51S that is open at the bottom, formed from a side wall 53 that is provided protruding in a cylindrical shape from the outer peripheral part of the top wall 52. The top wall 52 is provided with a circular seat surface 52a, where flat surfaces 52b and inclined surfaces 52c are disposed alternatingly on the outer peripheral side of the seat surface 52a. The inclined surfaces 51c are disposed so as to face the side connection holes 33a, where ducts that connect to the first connection conduit 32a are formed along the space there above (See FIG. 3). A guide protrusion 53a is formed on the side wall 53. The guide protrusion 53a not only guides the first float 51 in the vertical direction, through protruding into a guide hole 33b, but also prevents the rotation of the first float 51, so that the inclined surface 52c will be positioned so as to face the side connection hole 33a.

Figure 6:
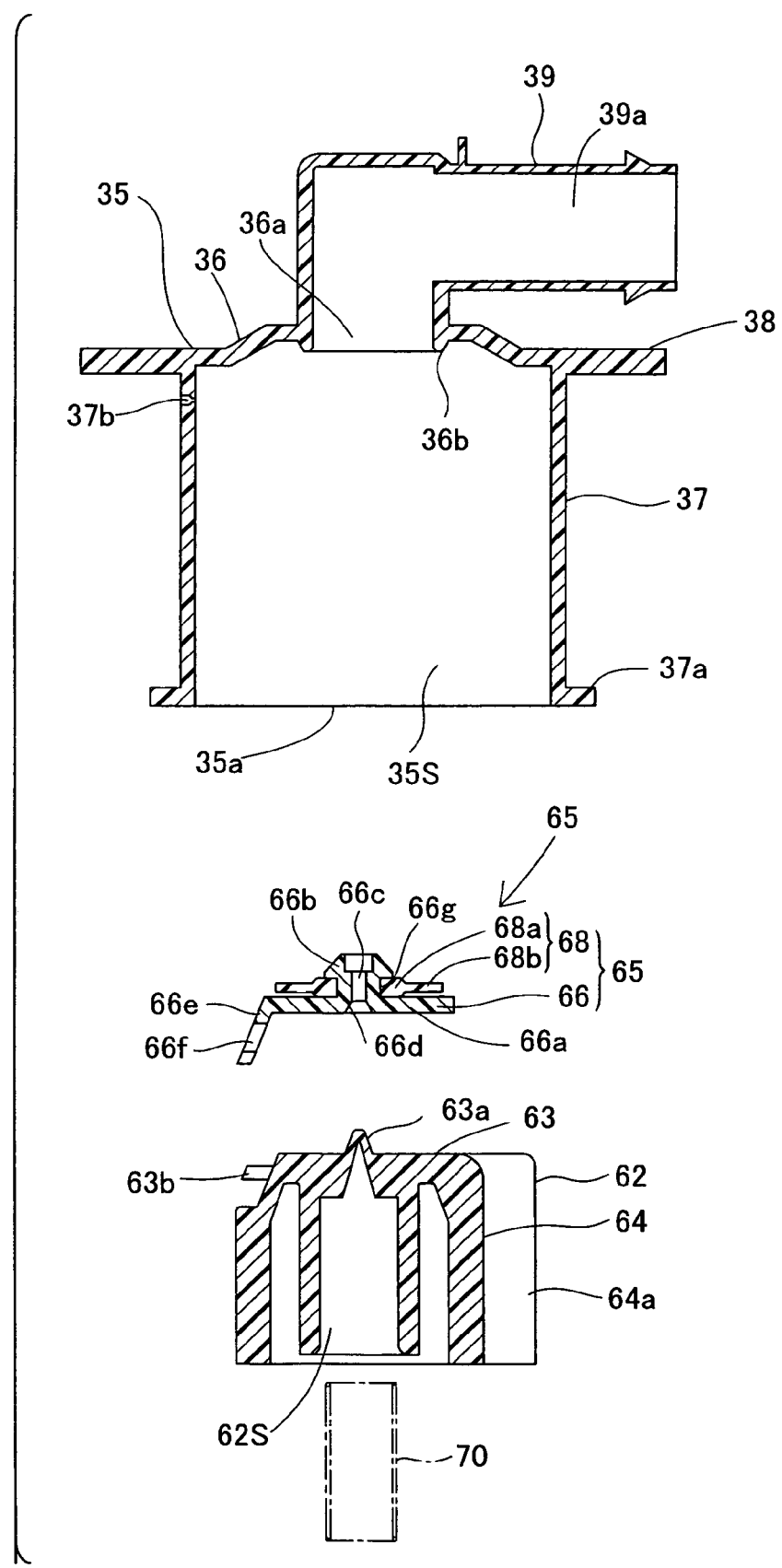
FIG. 6 is a cross-sectional view of the assembly of a second casing part and a second valve mechanism.
Figure 7:
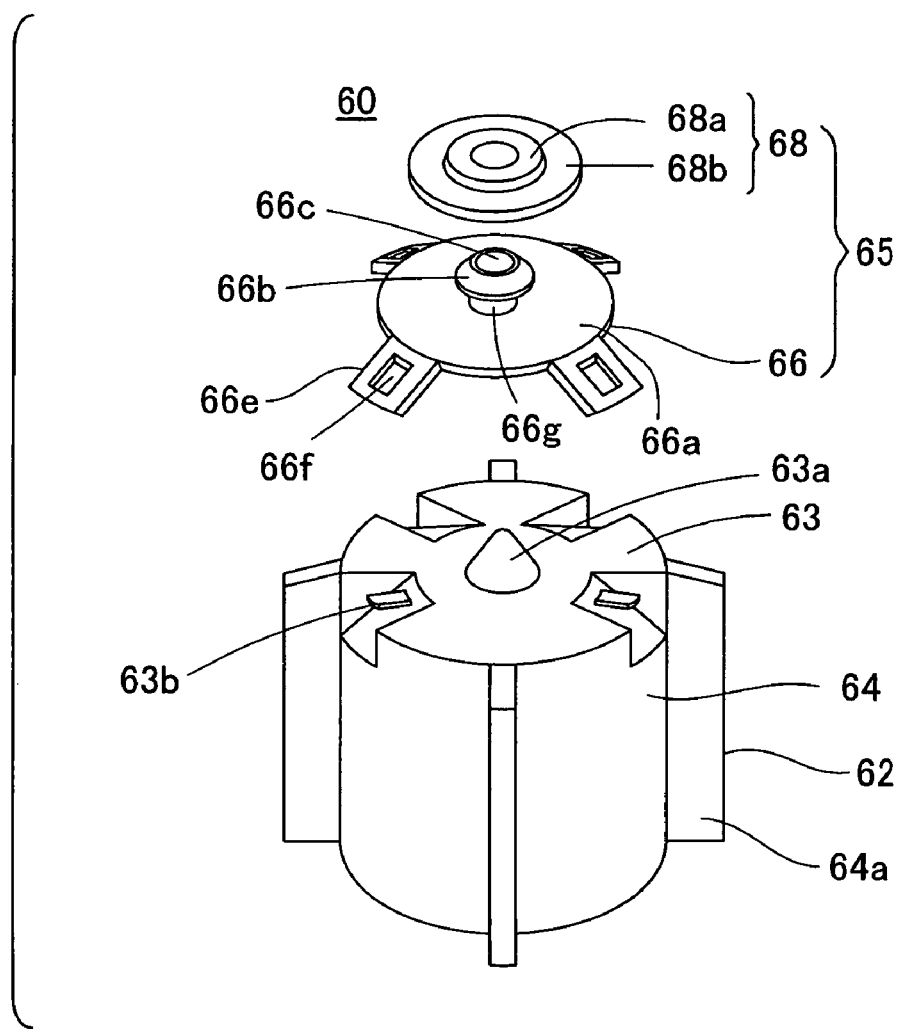
FIG. 7 is a perspective view of the assembly of a second casing part and a second valve mechanism.

FIG. 6 is a cross sectional drawing illustrating the assembly of the second casing part 35 and the second valve mechanism 60, and FIG. 7 is a perspective view illustrating the assembly of the second casing part 35 and the second valve mechanism 60. The second casing part 35 is a cup shape with a top wall 36 and a cylindrical side wall 37, with a lower opening 35a at the bottom thereof. A second connection conduit 36a is formed in the top wall 36, and the opening peripheral part thereof forms a second seal part 36b. A flange 37a, which extends in the outer peripheral direction, is formed at the bottom edge part of the side wall 37. The flange 37a is integrated with the first casing part 30 through being welded to the top step part 32d of the first casing part 40 shown in FIG. 4. Moreover, a vent 37b is formed in the upper part of the side wall 37. The vent 37b is a hole for the passage of air for draining the fuel that accumulates in the second valve chamber 35S. A flange 38 is provided extending from the outer peripheral part of the top wall 36, for attaching to the tank upper wall FTa (See FIG. 3.). Moreover, a tubular member 39 is equipped protruding from the center part of the top wall 36. A cover passage 39a that connects to the second connection conduit 36a is formed within the tubular member 39.

The second valve mechanism 60 is housed within the second valve chamber 35S, and is provided with a second float 62, an upper valve mechanism 65, and a spring 70. The second float 62 is a cup shape that has a buoyancy chamber 62S at the bottom, and comprises a top wall 63 and a side wall 64, which is provided protruding in a cylindrical shape from the outer peripheral part of the top wall 63. A conical valve portion 63a is formed in the center part of the top wall 63. Four guide ribs 64a are formed at equal intervals in the peripheral direction of the side wall 64, extending in the vertical direction. The guide ribs 64a provide guidance when the second float 62 rises and falls, so as to prevent the second float 62 from tilting, through sliding on the inner wall of the side wall 37 of the second casing part 35. The second float 62 is supported by the spring 70, which spans between the bottom surface of the top wall 63 and the top plate 34a of the first casing part 30 (See FIG. 4.). The position of the spring 70 is determined by the spring support 34d of the top plate 34a.

The upper valve mechanism 65 is a valve for improving the valve reopening performance, and is supported on the upper part of the second float 62 so as to be able to rise and fall, and comprises a valve support member 66 and a rubber valve member 68 that is attached to the valve support member 66. The valve support member 66 is provided with a disk-shaped support top plate 66a, with a valve conduit protrusion 66b equipped protruding in the upwards direction from the center thereof, with a connection hole 66c passing through this valve conduit protrusion 66b. A lower seal part 66d is formed at the bottom part opening periphery of the connection hole 66c, and pushes against/is removed from the valve portion 63a of the second float 62. Four support arms 66e are equipped protruding in the diagonal downward direction at an interval of 90 degrees around the outer peripheral part of the support top plate 66a. Guide holes 66f are formed in the support arms 66e, where the insertion of retainer protrusions 63b of the second float 62 supports the upper valve mechanism 65 with a specific spacing relative to the second float 62 in such a way as to be able to rise and fall.

A valve retainer recess 66g is formed at the outer peripheral part of the valve conduit protrusion 66b at the upper part of the valve support member 66. The rubber valve member 68 is supported on the valve support member 66 through press fitting of a support base 68a of the rubber valve member 68 into the valve retainer recess 66g. The rubber valve member 68 is provided with a seat part 68b at the outer peripheral part of the support base 68a, where this seat part 68b opens and closes the second connection conduit 36a through pressing against/withdrawing from the second seal part 36b.

(3) Action of the Fuel Cut off Valve

Next the action of the fuel cut off valve 10 will be explained. In FIG. 3, when the fuel is supplied into the fuel tank FT during fueling, the fuel level within the fuel tank FT rises, and the fuel vapors that have accumulated in the upper part of the fuel tank FT escape to the canister through a tube from the fuel cut off valve 10. In other words, during the period wherein the fuel level within the fuel tank FT has not reached the first liquid level FL1, the first float 51 and the second float 62 are not in contact with the respective first seal parts 32b and 36b of the first valve chamber 31S and the second valve chamber 35S, and thus the fuel vapors go into the second valve chamber 35S through the first valve chamber 31S and the first connection conduit 32a, and flow from the second valve chamber 35S into the canister through the second connection conduit 36a and the cover passage 39a.

Figure 8:
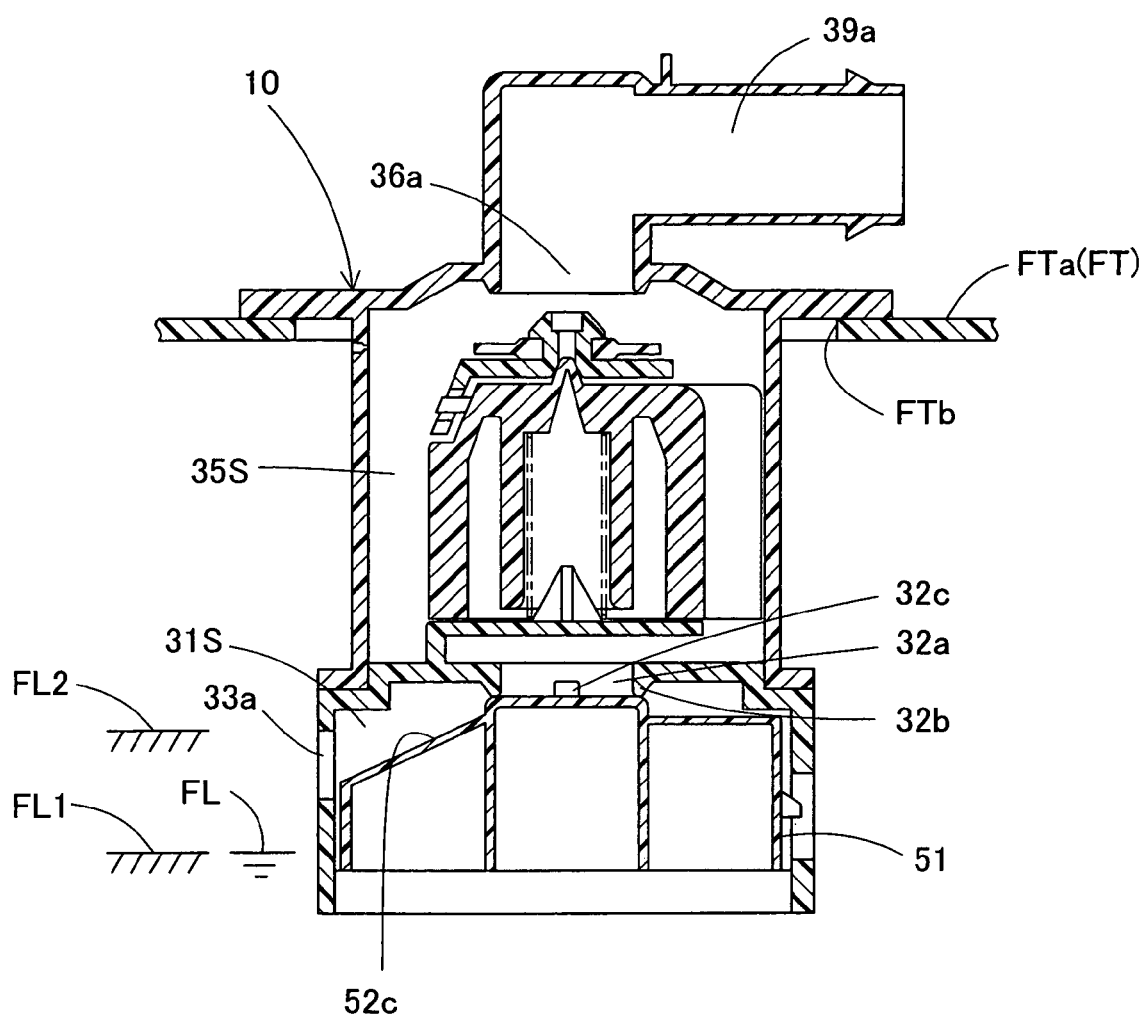
FIG. 8 shows the action of the fuel cut off valve.

As is shown in FIG. 8, when the fuel level FL within the fuel tank FT rises to reach the first liquid level FL1, the fuel flows into the first valve chamber 31S. When, for the first float 51, the buoyant force overwhelms the weight, the first float 51 immediately rises to seat against the first seal part 32b to close the first connection conduit 32a. In this state, the valve conduit 32c, formed in the first seal part 32b, maintains a gas opening in a state wherein the conduit area of the first connection conduit 32a is constricted, and thus the fuel vapors within the fuel tank FT passed from the side connection hole 33a through the conduit at the top of the inclined surface 52c of the first float 51, and then escape into the canister through the valve conduit 32c, the second valve chamber 35S, the second connection conduit 36a, and the cover passage 39a. At this time, the gas flow is restricted by the valve conduit 32c, formed from the restriction path, and thus the pressure within the fuel tank FT increases. The increase in the pressure within the fuel tank causes the fluid level within the inlet pipe to rise, which triggers the auto-stop that stops the fuel supply from the fuel gun. However, the ducts, such as the valve conduit 32c, prevent a rapid rise in the pressure within the fuel tank through connecting the fuel tank FT to the canister, thus enabling a prevention of the accompanying fuel blowback.

Figure 9:
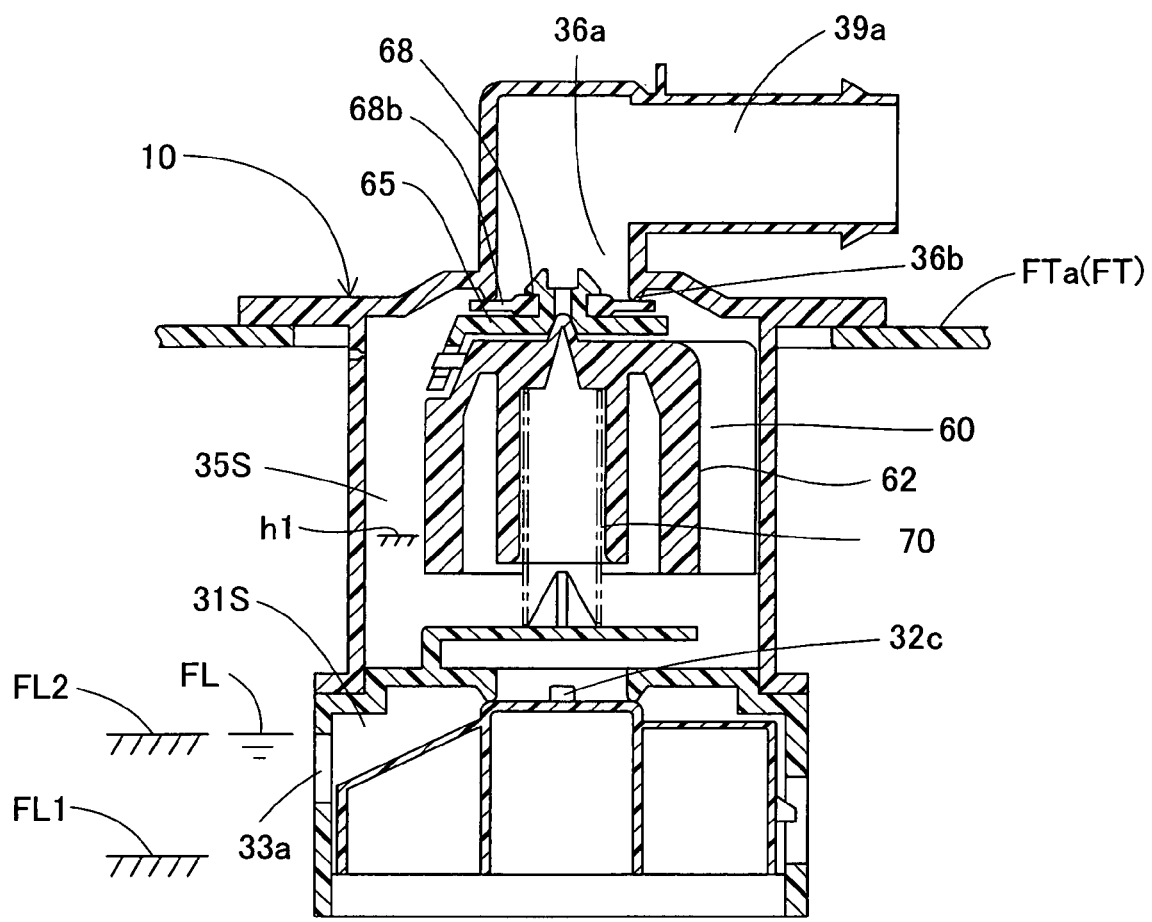
FIG. 9 shows a step subsequent to that of FIG. 8.

Furthermore, as is shown in FIG. 9, when the fuel level FL reaches the second liquid level FL2, the side connection hole 33a is blocked. When in this state, the flow of the fuel vapors to the second valve chamber 35S through the valve conduit 32c is cutoff. The second valve chamber 35S is connected to the canister through the second connection conduit 36a and the cover passage 39a, and so the pressure therein is essentially at atmospheric pressure. However, because the pressure within the fuel tank FT is greater than atmospheric pressure, the pressure differential causes the fuel to flow rapidly into the second valve chamber 35S through the first valve chamber 31S and the valve conduit 32c. Given this, when the fuel level within the second valve chamber 35S reaches the height H1, the balance between the buoyant force of the second float 62 and the upward force due to the weight on the spring 70, and the force in the downward direction due to the weight of the second valve mechanism 60, which comprises the second float 62 and the upper valve mechanism 65, causes the second valve mechanism to rise when the former overwhelms the later, causing the seat part 68b of the rubber valve member 68 to seat against the second seal part 36b to close the second connection conduit 36a. This closes the conduit that connects to the canister sealing the fuel tank FT relative to the canister side, thereby enabling the fuel gun to prevent overfilling.

Figure 10:
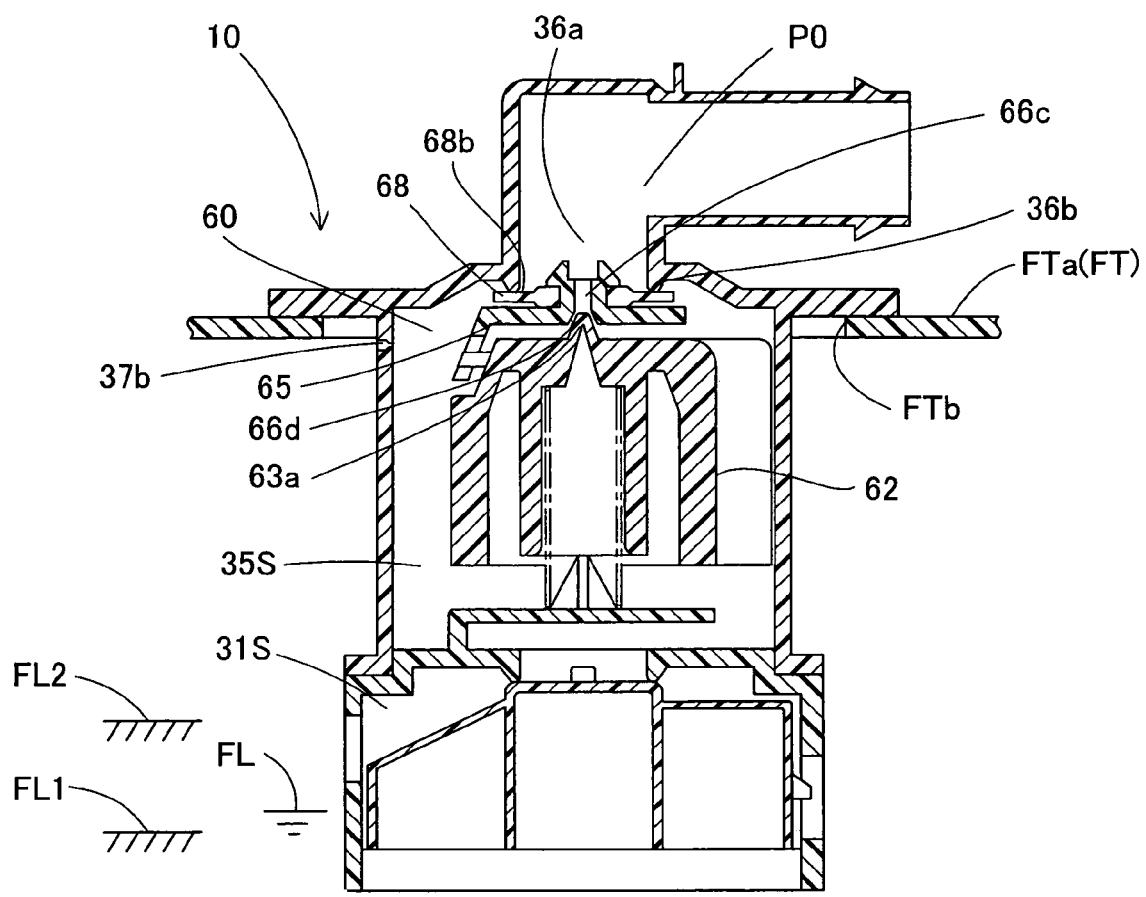
FIG. 10 shows a step subsequent to that of FIG. 9.

Moreover, as is shown in FIG. 10, as the fuel within the fuel tank FT is consumed and the fuel level FT drops, the second float 62 will drop slightly as the buoyant force is reduced. The downward motion of the second float 62 causes the valve portion 63a of the second float 62 to come separate from the lower seal part 66d to open the connection hole 66c. The opening of the connection hole 66c causes the pressure in the downward direction on the upper valve mechanism 65 to be equal to the pressure in the vicinity of the second connection conduit 36a, and the downward motion of the upper valve mechanism 65 causes the seat part 68b of the rubber valve member 68 to separate from the second seal part 36b to open the second connection conduit 36a, causing the inside of the fuel tank FT to be open towards the canister side.

Here the reason why the valve reopening performance is improved in the fuel cut off valve 10 will be explained. In FIG. 10, the conduit area of the connection hole 66c of the upper valve mechanism 65 is defined as S1, the pressure within the fuel tank is defined as P1, the canister-side pressure is defined as P0, the spring load weight is defined as K, and the total weight of the second float 62 and the upper valve mechanism 65 is defined as W, so the rubber valve member 68 of the upper valve mechanism 65 opens, from a closed state, when these values fulfill the following equation:

$$(P1-P0)S1 \leq W-K \qquad (1)$$

The right-hand side of Equation (1) is a positive value, the difference between the spring load K and the weight W, or in other words, is the force that is applied in the opening direction onto the upper valve mechanism 65, and when this is assumed to be a constant, then the left-hand side of Equation (1) is the force that is applied in the closing direction, so as to hold the seat part 68b of the upper valve mechanism 65 against the second seal part 36b through suction. If the conduit area S1 is small, then the valve will open even if there is a large pressure differential (P1−P0). In other words, if the canister-side pressure P0 is assumed to be constant, then even if there is a large tank-side pressure P1, the valve will open. Consequently, when the conduit area of the connection hole 66c is set so as to be smaller than the conduit area of the second connection conduit 36a, the upper valve mechanism 65 opens the valve with a small force from the second seal part 36b. In this way, a two-stage valve structure, comprising a rubber valve member 68, of the upper valve mechanism 65, and a valve portion 63a of the second float 62, functions so as to facilitate an improvement in the valve reopening performance.

(4) Action and Effects of the Embodiment

The structure of the embodiment described above provides the following actions and effects:

(4)-1 When the fuel level within the fuel tank FT exceeds the first liquid level FL1 due to fueling, the first float 51 closes a portion of the first connection conduit 32a, causing an increase in the pressure within the fuel tank FT, which can trigger the auto-stop. In this state, the pressure within the fuel tank FT escapes to the canister side through the valve conduit 32c, the second valve chamber 35S, etc., thus making it possible to prevent blowback of the fuel.

(4)-2 The fuel cut off valve 10 does not require the middle chamber, as described in the conventional technology, thus enabling a large increase in the effective capacity of the fuel tank FT because the so-called "dead space" within the tank can be reduced because the fuel is not held in the vicinity of the top wall of the fuel tank FT.

(4)-3 Overfill can be prevented because the second valve mechanism 60 closes the second connection conduit 36a, to tightly seal the fuel tank FT on the canister side, when the fuel level FL reaches the second liquid level FL2, which is higher than the first liquid level FL1 during fueling.

(4)-4 The first liquid level FL1 can be set independently, by the rise position of the first float 51, from the second liquid level FL2, which is set by the position in the height direction of the side connection hole 33a, where, by setting the distance between the two level to be small, the size in the height direction will not be large, thus enabling an application to a flat fuel tank configuration when one wishes the amount of added fuel to be small.

(4)-5 The vent 37b shown in FIG. 10 acts as an air inlet valve, for draining the fuel that has entered into the second valve chamber 35S, from the second valve chamber 35S into the fuel tank FT as the fuel level FL within the fuel tank FT drops, thus enabling the fuel within the second valve chamber 35S to be drained rapidly, so that the second valve mechanism 60 can open the second connecting conduit 36a to maintain the air opening from the fuel tank FT to the canister side.

(4)-6 The conduit from the fuel cut off valve 10 to the canister side to the outside is only the second connection conduit 36a, and there is a seal in only one place, that being the second seal part 36b, and thus the structure is simple, with excellent seal performance, and with an excellent effect of preventing leakage.

(4)-7 As is shown in FIG. 3, when the fuel level nears the first liquid level FL1 and the first float 51 rises, the gas flow that flows from the side connection hole 33a to the first connection conduit 32a increases. At this time, an upward force, so as to draw the first float 51 towards the first connection conduit 32a side, is applied by the Bernoulli principle, but a force F0 that pushes against the inclined surface 52c is applied by the gas flow that flows from the side connection hole 33a to the first connection conduit 32a is applied as a force that pushes on the inclined surface 52c, and this is split into a component force F1 that is applied to the inclined surface 52c in the perpendicular direction and a component force F2 that is applied along the inclined surface 52c, where the component force F1 acts as a component force F1a that depresses the first float 51. Because of this, as the fuel level approaches the first liquid level FL1, the first float 51 does not rise rapidly, and thus there will be no variability in the auto-stop fluid level.

(4)-8 The valve conduit 32c of the first seal part 32b is formed through cutting away a portion of the first seal part 32b, which can prevent the seat surface 52a of the first float 51 from sticking to the first seal part 32b when the first seal part 32b is seated on the seat surface 52a of the first float 51.

B. Second Embodiment

Figure 11:
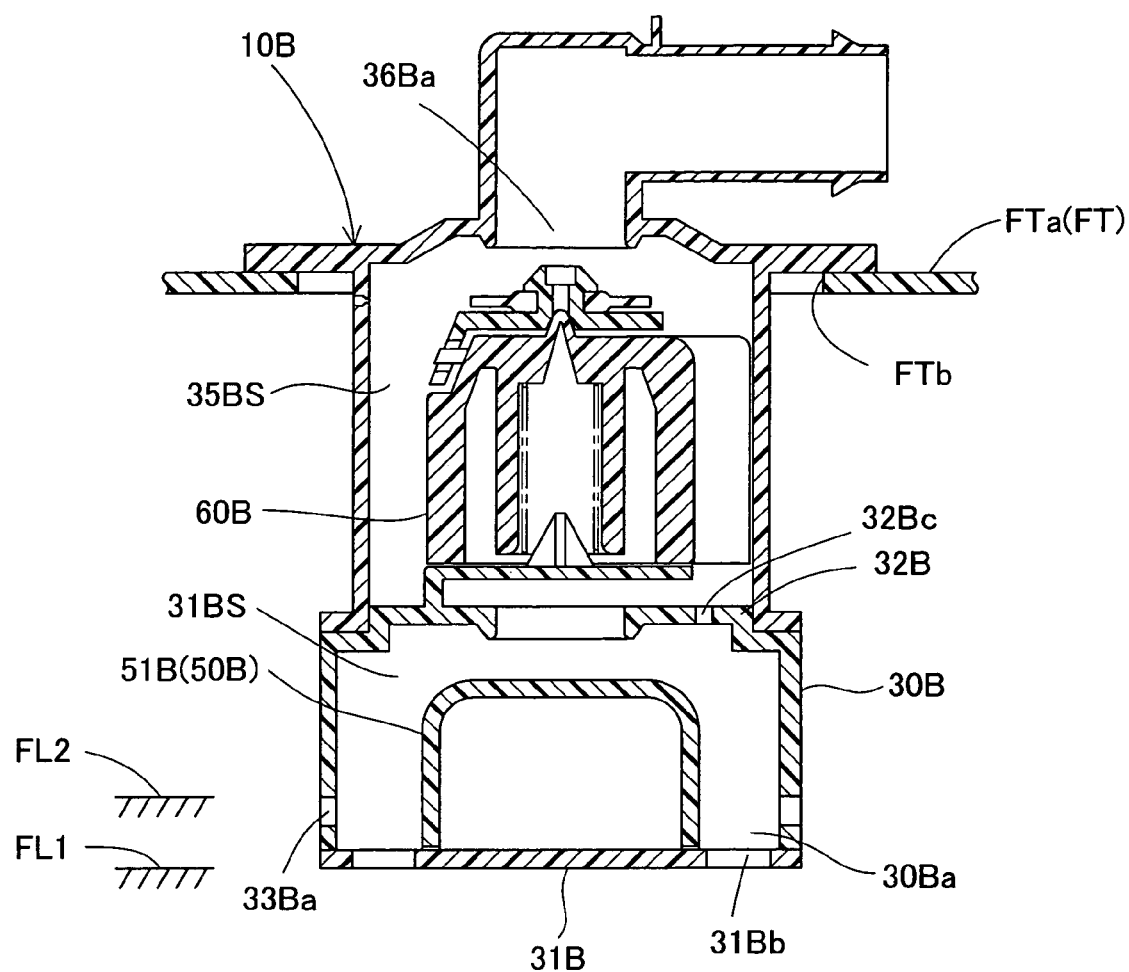
FIG. 11 is a cross-sectional view illustrating a fuel cut off valve according to a second embodiment.

FIG. 11 is a cross-sectional view showing a fuel cut off valve 10B according to a second embodiment. The second embodiment has, as its distinctive feature, a valve conduit 32Bc. In other words, a valve conduit 32Bc is formed in the top wall 32B (partition wall) that divides between the first valve chamber 31BS and the second valve chamber 35BS. Moreover, the structure of the first casing part 30B and the structure of the first valve mechanism 50B is somewhat different from the structure in the first embodiment. The lower opening 31Ba of the first casing part 30B is covered by a bottom cover 31B, and a connection hole 31Bb is formed in the bottom cover 31B.

In this structure, not only does the fuel block the connection hole 31Bb of the bottom cover 31B when the fuel level reaches the first liquid level FL1, but also the fuel is caused to flow into the first valve chamber 31BS by the differential pressure between the first valve chamber 31BS and the fuel tank FT to cause the first float 51B to move upward and close the first connection conduit 32Ba. This causes the conduit area for the flow from the fuel tank FT to the canister side to be constricted, by the valve conduit 32Bc, triggering the auto-stop. Moreover, when the fuel level reaches the second liquid level FL2, blocking the side connection hole 33Ba, the fuel flows to the second valve chamber 35BS side, causing the second connection conduit 36Ba to be closed by the second valve mechanism 60B, preventing overfill.

C. Third Embodiment

Figure 12:
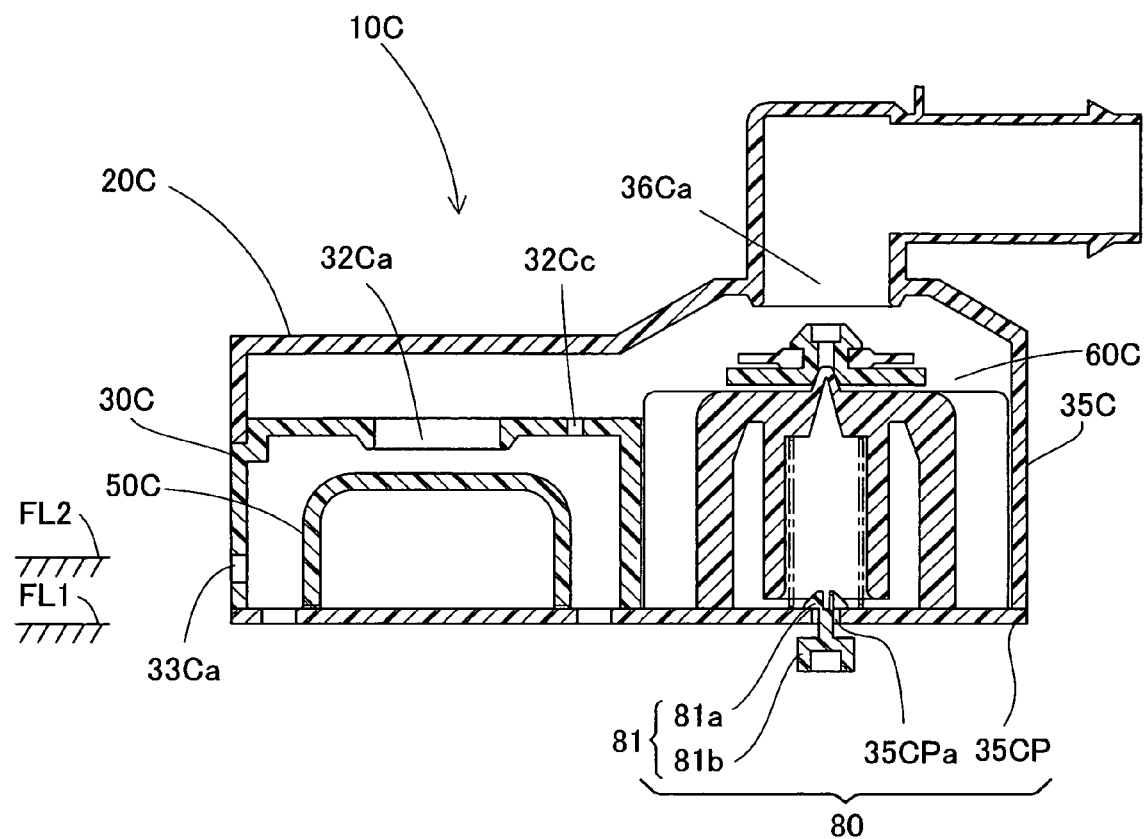
FIG. 12 is a cross-sectional view illustrating a fuel cut off valve according to a third embodiment.

FIG. 12 is a cross-sectional view illustrating a fuel cut off valve 10C according to a third embodiment. The third embodiment has a structure that is different from that of the second embodiment, with a first casing part 30C and a second casing part 35C of the casing 20C disposed in parallel and not only connected by an valve conduit 32Cc, but wherein a first valve mechanism 50C and a second valve mechanism 60C are housed within the first and second casing parts 30C and 35C. While the structure and opening/closing action in the third embodiment are essentially the same as those in the second embodiment, a drain mechanism 80 for draining the fuel that accumulates in the second valve chamber 35Cs is provided. The drain mechanism 80 is provided with a valve body 81 that passes through a drain conduit 35CPa, which passes through the bottom cover 35CP. The valve body 81 comprises a catching part 81a that mates with the bottom cover 35CP, and a buoyancy part 81b that is provided extending downwards from the catching part 81a and the that opens and closes the drain conduit 35CPa.

In the fuel cut off valve 10C, the first valve mechanism 50C closes the first connection conduit 32Ca when the fuel level reaches the first liquid level FL1. At this time, the conduit area of the first connection conduit 32Ca is constricted to that of the valve conduit 32Cc, and thus the pressure within the fuel tank FT increases, triggering the auto stop. Because the valve body 81 rises to close the drain conduit 35CPa in this state, this does not interfere with the rise in the tank-internal pressure. Furthermore, when the fuel level reaches the second liquid level FL2, the fuel flows into the second valve chamber 35CS to the valve conduit 32Cc and the drain mechanism 80, because the side connection hole 33Ca is closed, the second valve mechanism 60c rises to close the second connection conduit 36Ca. Overfill is prevented thereby. Moreover, when the fuel level falls, the valve body 81 moves downward, opening the drain conduit 35CPa, and the fuel drains from the second valve chamber 35CS. In this way, when the fuel level FL drops, the fuel within the second valve chamber 35CS drains rapidly, avoiding a state wherein the second valve mechanism 60C continues to keep the second connection conduit 36Ca closed.

Given the fuel cut off valve 10C according to the present embodiment, the disposition of the first casing part 30C and the second casing part 35C in parallel can contribute to the flattening of the fuel tank FT.

Although in the present embodiment, the structure is one wherein the drain conduit 35CPa is closed when the fuel level reaches the second liquid level FL2, instead of structure may be one wherein the valve unit 81 closes the drain conduit 35CPa prior to the fuel reaching the second liquid level FL2.

Figure 13:
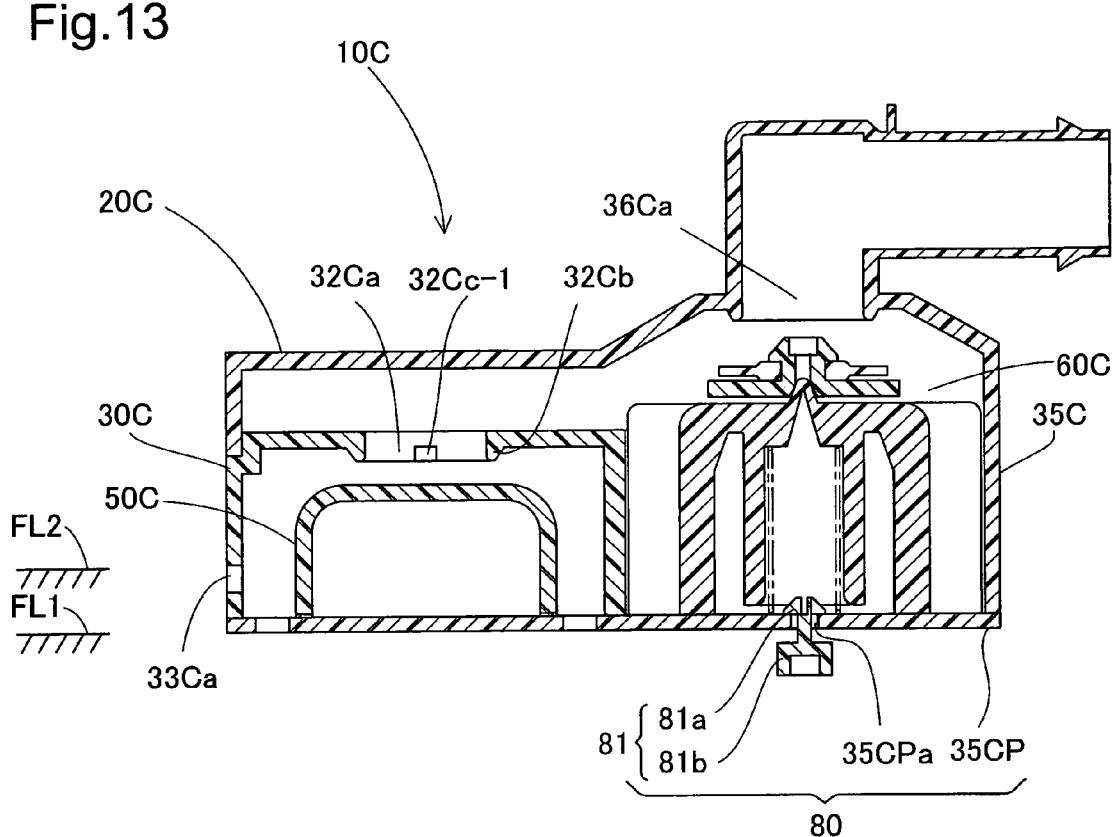
FIG. 13 is a cross-sectional view illustrating a fuel cut off valve according to an alternative the third embodiment.

Note that while in the third embodiment a first casing part 30C and a second casing part 35C were disposed in parallel, and a valve conduit 32Cc was provided in the partition wall at the top of the first casing part 30C, instead, as is shown in FIG. 13, the same result can be achieved through the provision of a valve conduit 32Cc-1 in the first seal part 32Cb

D. Fourth Embodiment

Figure 14:
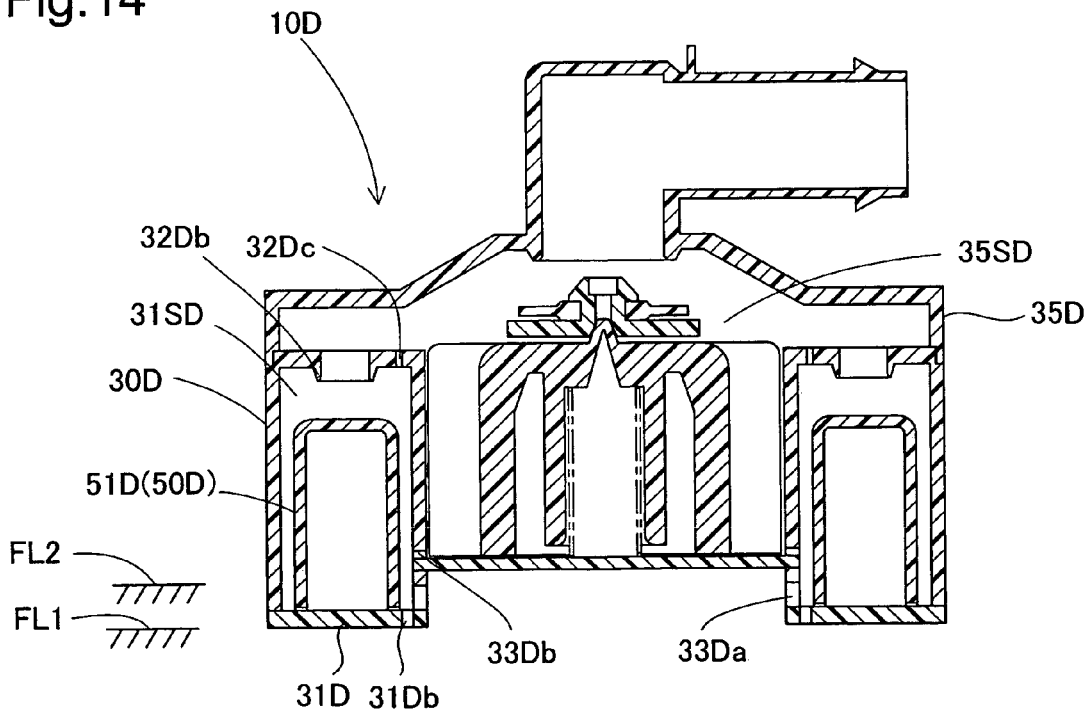
FIG. 14 is a cross-sectional view illustrating a fuel cut off valve according to a fourth embodiment.

FIG. 14 shows a cross-sectional view illustrating a fuel cut off valve 10D according to a fourth embodiment. In the fourth embodiment, the distinctive feature is the structure of the first casing part 30D and the first valve mechanism 50D. That is, the first casing part 30D is disposed in parallel with the second casing part 35D, and has an enclosing donut shape, where a ring-shaped first float 51D is housed within the first valve chamber 31DS. The first float 51D being a donut shape can be made thinner while providing the same buoyant force, not only contributing to a flattening of the fuel tank but also enabling a reduction of the dead space in the fuel tank FT.

Here the valve conduit 32Dc is formed in the top wall of the first casing part 30D, but, conversely, may be formed in the first seal part 32Db. Moreover, a connection hole 31Db is provided in the bottom cover 31D, and the first liquid level FL1 is set to the fuel level that blocks the connection hole 31Bb, and the second liquid level FL2 is set to the fluid level that blocks the side connection hole 33Da. Moreover, a drain hole 30Db is formed on the bottom part of the first casing part 30D as a drain mechanism. The drain hole 30Db acts to drain the fuel from the second valve chamber 35DS, but is formed as a small-diameter conduit so as to not reduce the pressure within the fuel tank.

Note that the present invention is not limited to the embodiment described above, but rather may be embodied in a variety of forms in a scope that does not deviate from the intent thereof, and alternative forms such as follow are possible.

Figure 15:
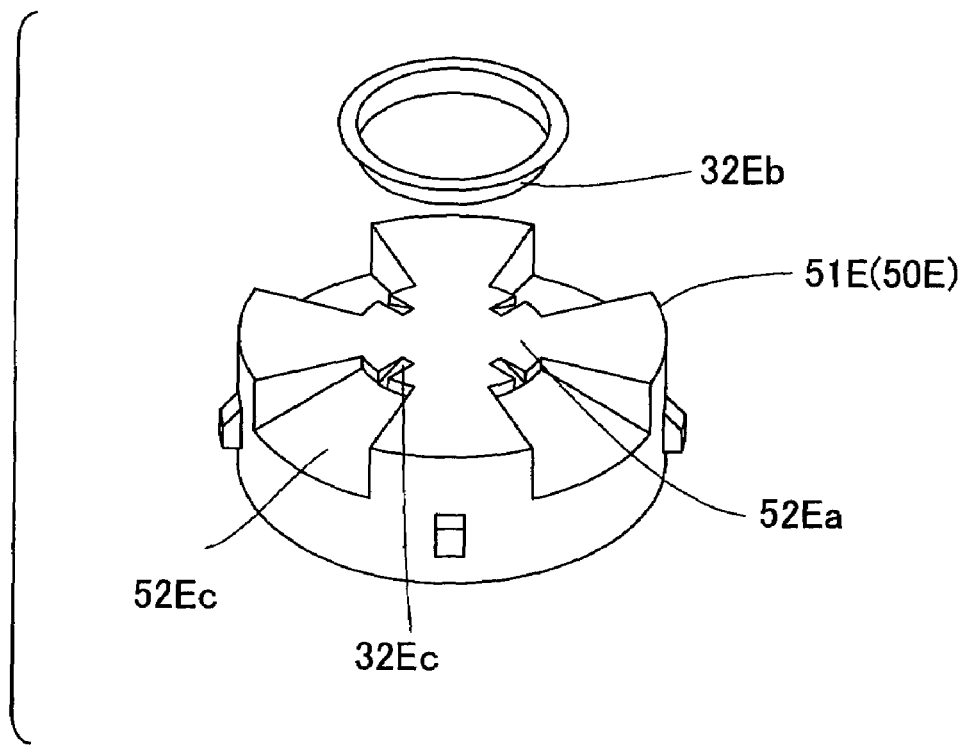
FIG. 15 shows a first valve mechanism according to a fifth embodiment.

Although a restriction path is structured through the formation of a valve conduit 32c in the first seal part 32b in the first embodiment, shown in FIG. 3, the present invention is not limited thereto, but rather, as shown in FIG. 15, the restriction path may be formed in the upper part of the first valve mechanism 50E. In other words, the restriction path may be formed at the first seal part 32Eb by forming a valve conduit 32Ec through cutouts, in the seat surface 52Ea of the upper part of the first float 51E, connecting from the inclined surface 52Ec to the seat surface 52Ea.

While in the fuel cut off valves according to the embodiment described above explanations were made of structures by which to attach so as to block the attachment holes formed in the tank upper walls, the present invention is not limited thereto, but rather may use a structure wherein the fuel cut off valve is attached at the upper part of the inside of the fuel tank, using the so-called "in-tank" method.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cut off valve that is to be attached to an upper portion of a fuel tank and opens and closes a connection conduit for connecting an inside of the tank to outside of the tank according to a fuel level in the fuel tank, the cut off valve comprising:
   a casing including
      (i) a first valve chamber that is connected to the inside of the fuel tank,
      (ii) a second valve chamber that is connected to the first valve chamber,
      (iii) a first connection conduit that connects the first valve chamber and the second valve chamber, and
      (iv) a second connection conduit that connects the second valve chamber to the outside;
   a first valve mechanism, housed within the first valve chamber, that closes the first connection conduit when the fuel level rises to reach a first liquid level;
   a second valve mechanism, housed in the second valve chamber, that closes the second connection conduit when the fuel level reaches a second liquid level that is higher than the first liquid level; and
   a restriction path, disposed between the first valve chamber and the second valve chamber, that reduces the flow from the first valve chamber to the second valve chamber so as to increase the pressure within the fuel tank when the first valve mechanism closes the first connect conduit.

2. The fuel cut off valve according to claim 1, wherein the casing includes a first seal part in an opening peripheral part of the first connection conduit, and
   the restriction path is formed between the first valve mechanism and the first seal part.

3. The fuel cut off valve according to claim 2, wherein the restriction path comprises a valve conduit that is connected to the first connection conduit and is formed by cutting out a part of the first seal part.

4. The fuel cut off valve according to claim 2, wherein the restriction path comprises a valve conduit that is formed by cutting out a part of the first valve mechanism.

5. The fuel cut off valve according to claim 2, wherein the casing comprises a side connection hole that is blocked by the fuel when the fuel level reaches the second liquid level, the side connection hole being configured such that the pressure differential between the pressure within the fuel tank and the pressure in the second valve chamber causes the fuel to flow into the second valve chamber so that the second valve mechanism closes the second connection conduit.

6. The fuel cut off valve according to claim 5, wherein the first valve mechanism comprises a first float that moves upwards due to the buoyant force that is produced by the fuel flowing into the first valve chamber when the fuel level reaches the first liquid level, the first float being configured to have an inclined surface that produces a component force that pushes the first float in the downward direction, due to a gas flow that is introduced into the first connection conduit from the side connection hole.

7. The fuel cut off valve according to claim 6, wherein a side wall of the first float comprises a guide protrusion, and the casing comprises a guide hole for guiding the guide protrusion, the guide protrusion and the guide hole being configured such that the first float is guided in the vertical direction and is prevented from rotating relative to the casing.

8. The fuel cut off valve according to claim 2, wherein the second valve mechanism comprises (i) a second float that has a valve portion, (ii) an upper valve mechanism that has a connection hole that has a smaller conduit area than the second connection conduit and that is connected to the second connection conduit, and a seat part that is attached to an upper part of the second float and that opens and closes the second connection conduit, the second valve mechanism being configured such that the connection hole is opened and closed by the valve portion through the rising and falling of the second float.

9. The fuel cut off valve according to claim 2, wherein the first valve chamber is disposed in parallel with the second valve chamber in the casing.

10. The fuel cut off valve according to claim 9, further comprising a drain mechanism that drains the fuel within the second valve chamber when the fuel level falls below the bottom edge of the second valve chamber of the casing.

11. The fuel cut off valve according to claim 10, wherein the drain mechanism is configured to close a path connecting the second valve chamber and the fuel tank prior to the fuel level reaching the second liquid level.

12. The fuel cut off valve according to claim 1,
wherein the casing comprises a partition wall that divides the first valve chamber and the second valve chamber, and
the restriction path comprises a valve conduit that is formed in the partition wall.

13. The fuel cut off valve according to claim 12, wherein the casing comprises a side connection hole that is blocked by the fuel when the fuel level reaches the second liquid level, the side connection hole being configured such that the pressure differential between the pressure within the fuel tank and the pressure in the second valve chamber causes the fuel to flow into the second valve chamber so that the second valve mechanism closes the second connection conduit.

14. The fuel cut off valve according to claim 13, wherein the first valve mechanism comprises a first float that moves upwards due to the buoyant force that is produced by the fuel flowing into the first valve chamber when the fuel level reaches the first liquid level, the first float configured to have an inclined surface that produces a component force that pushes the first float in the downward direction, due to a gas flow that is introduced into the first connection conduit from the side connection hole.

15. The fuel cut off valve according to claim 14, wherein the first float comprises a side wall with a guide protrusion, and the casing comprises a guide hole for guiding the guide protrusion, the guide protrusion and the guide hole being configured such that the first float is guided in the vertical direction and is prevented from rotating relative to the casing.

16. The fuel cut off valve according to claim 12, wherein the second valve mechanism comprises
(i) a second float that has a valve portion,
(ii) an upper valve mechanism that has a connection hole that has a smaller conduit area than the second connection conduit and that is connected to the second connection conduit, and a seat part that is attached to an upper part of the second float and that opens and closes the second connection conduit,
the second valve mechanism being configured such that the connection hole is opened and closed by the valve portion through the falling and the rising of the second float.

17. The fuel cut off valve according to claim 12, wherein the first valve chamber is disposed in parallel with the second valve chamber in the casing.

18. The fuel cut off valve according to claim 17, further comprising a drain mechanism that drains the fuel within the second valve chamber when the fuel level falls below the bottom edge of the second valve chamber of the casing.

19. The fuel cut off valve according to claim 18, wherein the drain mechanism is configured to close a path connecting the second valve chamber and the fuel tank prior to the fuel level reaching the second liquid level.

20. A cut off valve that is to be attached to an upper portion of a fuel tank and opens and closes a connection conduit for connecting an inside of the tank to outside of the tank according to a fuel level in the fuel tank, the cut off valve comprising:
a casing including
(i) a first valve chamber that is connected to the inside of the fuel tank,
(ii) a second valve chamber that is connected to the first valve chamber,
(iii) a first connection conduit that connects the first valve chamber and the second valve chamber,
(iv) a first seal part that is formed on an opening peripheral part of the first connection conduit,
(v) a second connection conduit that connects the second valve chamber and the outside, and
(vi) a second seal part that is formed on an opening peripheral part of the second connection conduit;
a first valve mechanism, housed in the first valve chamber, that seats on the first seal part to close the first connection conduit when the fuel level reaches a first liquid level;
a second valve mechanism, housed within the second valve chamber and seats on the second seal part to close the second connection conduit when the fuel level reaches a second liquid level, the second liquid level being higher than the first liquid level; and
a restriction path, formed between the first valve chamber and the second valve chamber, that forms a path area that is smaller than the conduit area of the first connection conduit, so as to cause the pressure within the fuel tank to rise when the first valve mechanism seats on the first seal part.

* * * * *